(12) United States Patent
Grepl

(10) Patent No.: US 8,751,132 B2
(45) Date of Patent: Jun. 10, 2014

(54) METHOD FOR ASCERTAINING A WHEEL REFERENCE SPEED OF A WHEEL ON A VEHICLE HAVING A HYDROSTATIC DRIVE, AND DEVICE FOR ASCERTAINING A WHEEL REFERENCE SPEED OF A WHEEL OF A VEHICLE HAVING A HYDROSTATIC DRIVE

(75) Inventor: Martin Grepl, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 545 days.

(21) Appl. No.: 12/920,040

(22) PCT Filed: Nov. 25, 2008

(86) PCT No.: PCT/EP2008/066113
§ 371 (c)(1),
(2), (4) Date: Aug. 27, 2010

(87) PCT Pub. No.: WO2009/106169
PCT Pub. Date: Sep. 3, 2009

(65) Prior Publication Data
US 2011/0015841 A1    Jan. 20, 2011

(30) Foreign Application Priority Data

Feb. 29, 2008    (DE) .......................... 10 2008 011 941

(51) Int. Cl.
*B60T 7/12*    (2006.01)
*G05D 1/00*    (2006.01)
*G06F 7/00*    (2006.01)
*G06F 17/00*   (2006.01)

(52) U.S. Cl.
USPC ................ 701/89; 701/82; 701/90; 180/242; 180/307; 180/197

(58) Field of Classification Search
USPC .............. 701/71–75, 82, 89, 90, 77; 180/242, 180/307, 197, 308; 56/DIG. 11
See application file for complete search history.

(56) References Cited

U.S. PATENT DOCUMENTS 4,989,471 A * 2/1991 Bulgrien .................... 74/336 R
(Continued)

FOREIGN PATENT DOCUMENTS

DE    199 18 882    12/1999
EP    1 716 737    11/2006
(Continued)

*Primary Examiner* — Jeffrey Shapiro
(74) *Attorney, Agent, or Firm* — Kenyon & Kenyon LLP

(57) ABSTRACT

A method for ascertaining a wheel reference speed of a wheel of a vehicle having a hydrostatic drive which uses a transfer medium, the hydrostatic drive acting at least on the one wheel, and the hydrostatic drive having an oscillating motor which may be swiveled to a pumping mode via which a torque may be applied to the wheel, and a wheel speed sensor for detecting the particular wheel speed being situated near the wheel, and the oscillating motor being appropriately adjusted while the wheel speed sensor ascertains the wheel reference speed in order to allow resistance-free flow of the transfer medium through the oscillating motor. The exemplary embodiments and/or exemplary methods of the present invention further relates to a device having arrangements for carrying out the method, and configured as a hydraulic drive control unit, for example.

10 Claims, 2 Drawing Sheets

(56) References Cited

U.S. PATENT DOCUMENTS

| | | | |
|---|---|---|---|
| 5,401,097 A * | 3/1995 | Schmitt | 303/154 |
| 5,474,368 A * | 12/1995 | Sano | 303/163 |
| 6,125,318 A * | 9/2000 | Zierolf | 701/71 |
| 6,196,644 B1 * | 3/2001 | Sager | 303/195 |
| 6,709,074 B2 * | 3/2004 | Wandel | 303/139 |
| 2004/0015279 A1 * | 1/2004 | Barron et al. | 701/37 |
| 2006/0243511 A1 * | 11/2006 | Ho et al. | 180/242 |

FOREIGN PATENT DOCUMENTS

| | | |
|---|---|---|
| FR | 2 651 729 | 3/1991 |
| JP | 10-71938 | 3/1998 |
| JP | 2000-25633 | 1/2000 |
| JP | 2001-138762 | 5/2001 |
| JP | 2004-330956 | 11/2004 |
| JP | 2008-37179 | 2/2008 |

* cited by examiner

METHOD FOR ASCERTAINING A WHEEL REFERENCE SPEED OF A WHEEL ON A VEHICLE HAVING A HYDROSTATIC DRIVE, AND DEVICE FOR ASCERTAINING A WHEEL REFERENCE SPEED OF A WHEEL OF A VEHICLE HAVING A HYDROSTATIC DRIVE

FIELD OF THE INVENTION

The present invention relates to a method for ascertaining a wheel reference speed of a wheel of a vehicle having a hydrostatic drive which uses a transfer medium, the hydrostatic drive acting at least on the one wheel, and the hydrostatic drive having an oscillating motor which may be swiveled to a pump mode, via which a torque may be applied to the wheel, and a wheel speed sensor for detecting the particular wheel speed being situated near the wheel.

BACKGROUND INFORMATION

When vehicle dynamics control systems are used in motor vehicles and mobile machines, the tire slip, also referred to as $\lambda$, is a key state variable of great importance. This state variable is necessary for slip control in antilock braking systems (ABS) and traction control systems (TCS). In these types of systems and controls, the object of control is to minimize an absolute difference between an actual slip acting on the particular wheel and a desired setpoint slip. The setpoint slip is computed in an appropriate controller. If only an ABS is used, a so-called instability controller may also be used.

This tire slip is also used as a control variable in commonly used electronic stability program (ESP) systems. A vehicle controller in the electronic stability program relies on a subordinate ABS and/or ASR slip controller.

Tire slip $\lambda$ is computed from free-running wheel speed $v_{free}$ and actual wheel speed $v_{actual}$ according to the formula:

$$\lambda = \frac{(v_{free} - v_{actual})}{v_{free}}.$$

Actual wheel speed $v_{actual}$ may be computed from wheel radius r and actual wheel speed $\Omega_{actual}$. This computation is carried out according to the formula $v_{actual} = r \cdot \Omega_{actual}$.

Free-running wheel speed $v_{free}$ may be ascertained using a free-running wheel speed $\Omega_{free}$ and the wheel radius according to $v_{free} = r \cdot \Omega_{free}$.

The free-running wheel speed is understood to mean the rotational speed which a wheel experiences solely by rolling on a road surface without being decelerated or accelerated.

Free-running wheel speed $\Omega_{free}$ is also frequently referred to as "wheel reference speed" in the literature.

However, it is precisely this wheel reference speed or free-running wheel speed $\Omega_{free}$ which is ultimately needed in the computation $$\lambda = \frac{r \cdot \Omega_{free} - (r \cdot \Omega_{actual})}{r \cdot \Omega_{free}},$$

which results in the tire slip. After rearrangement of the equation, $\lambda$ may be computed according to the following formula:

$$\lambda = 1 - \left(\frac{\Omega_{actual}}{\Omega_{free}}\right).$$

The actual wheel speed present during motion, i.e., during deceleration as well as acceleration of the wheel, is measured by wheel speed sensors which are present on each wheel. If the wheel is not accelerated or decelerated, the wheel runs freely in the sense that it rolls unimpeded on the road surface, thus allowing the wheel speed sensors to be used for determining the free-running wheel speed.

When the wheel runs, i.e., rolls, freely, $\Omega_{actual}$ is equal to $\Omega_{free}$. By using the value $\Omega_{actual}$ for the free-running wheel, free-running wheel speed $v_{free}$ may be ascertained by multiplying it by the wheel radius. This is possible because the slip is equal to zero when the wheel is freely rolling.

However, when the vehicle is accelerated or decelerated, one or more of the wheels are frequently in slip; i.e., they completely or partially slip. Other methods must then be used to allow the free-running wheel speed to be ascertained. Hydrostatic drives are commonly used in mobile machines as well as in other motor vehicles. These hydrostatic drives operate using transfer media for transmitting kinetic energy. As a rule mineral oils are used, although environmentally acceptable liquids such as water or specialized esters or glycols are finding increasing use. Hydrostatic drives have the advantage that in terms of energy they allow an essentially optimal type of gear transmission, since continuous adjustment of the speed on the drive side is possible.

A method and a device are known from DE 199 18 882 A1 for providing a control assistance and traction control system for hydrostatically driven vehicles. This document discloses a hydraulically driven vehicle having a front pair and a rear pair of wheels. An oscillating motor acts on each wheel, and is adjustable in such a way that it may be swiveled into a pump mode. The oscillating motor actively accelerates the particular wheel, whereas after switching to pump mode the oscillating motor appropriately decelerates the particular wheel. The rotational speed of the wheel is ascertained with the aid of wheel speed sensors mounted near the wheel.

As also disclosed in DE 199 18 882 A1, for hydrostatic drives deceleration is performed either exclusively or partially with the aid of the oscillating motors, also referred to as adjusting motors, due to the fact that the oscillating motors function as a pump and adapt to the oil pressure which develops from driving the pump and an adjoining internal combustion engine.

To intensify the deceleration effect it is common to use power brakes, for example mechanical service/parking brakes.

To ascertain the reference speed and/or the free-running wheel speed, an estimate is usually made by averaging the individual signals of the wheel speed sensors, which is performed on an arithmetic or weighted basis. This estimate is then further optimized using a corrective "vehicle model." This vehicle model takes into account, for example, the steering angle and the particular acceleration or deceleration of the vehicle. The particular measured minima and maxima of $\Omega_{actual}$ are ascertained for all wheels, for example all four wheels. Depending on the brake or traction control, the minima or maxima are selected and compared to one another by forming the median or mean. Support models which take into account the road surface, for example asphalt or ice, are then used.

In the case of acceleration, the rotational speed is limited by forming a maximum, i.e., the maximum possible acceleration. In the case of deceleration, the rotational speed is limited by forming a minimum, i.e., the maximum possible deceleration.

However, if all four wheels or individual wheels are clearly in slip, this conventional method results in an erroneous value for $\Omega_{free}$. The vehicle is then necessarily under- or overbraked. The handling capability of the vehicle is reduced while passing another vehicle, which in some cases may even result in accidents.

SUMMARY OF THE INVENTION

An object of the exemplary embodiments and/or exemplary methods of the present invention is achieved due to the fact that the oscillating motor is appropriately adjusted to allow resistance-free flow of the transfer medium through the oscillating motor while the wheel speed sensor ascertains the wheel reference speed.

This allows a more accurate and corrective determination of the particular wheel reference speed, resulting in a more accurate determination of the wheel slip. In particular for braking processes in which all wheels have a slip, correction by achieving an adaptation phase as the result of switching the oscillating motor to a resistance-free flow state is advantageous to avoid drift of the estimated slip.

The object is further achieved by using a device which contains arrangement, such as an appropriate hydraulic drive control unit, for carrying out the method according to the present invention.

Such a device has the advantage that it may also be retrofitted, and in vehicles having a hydrostatic drive, as in mobile machines, for example field sprayers, excavators, crawler-mounted vehicles, or the like, results in better control of the driving dynamic response.

In the exemplary embodiments and/or exemplary methods of the present invention, the term "wheel" refers to any device which allows locomotion and which rolls on the road surface. This also includes chains, tires, and rollers in particular.

Advantageous embodiments are claimed in greater detail in the subclaims and explained in greater detail below.

It is particularly advantageous when, before the wheel speed sensor ascertains the wheel reference speed, the oscillating motor is adjusted in such a way that transfer medium flows through the oscillating motor without resistance. This ensures that the wheel rolls freely while the wheel speed sensor ascertains the wheel reference speed; i.e., the inertial effects of the wheel are compensated for. If the wheel rotates on the road surface before the oscillating motor is switched to resistance-free flow, the wheel may be decelerated in such a way that it still rolls, whereas in the case in which it was formerly blocked, the wheel is re-accelerated to normal rolling speed when the oscillating motor is switched to free flow.

Since the greatest braking torque is transmitted to the front wheels, it is advantageous for the wheel reference speed to be ascertained at the rear wheels during braking. The front wheels are the wheels in front, viewed relative to the direction of travel, whereas the rear wheels are the wheels in the rear, viewed relative to the direction of travel of the vehicle. The measurement may be carried out in a particularly safe manner for the occupants or the driver of the vehicle when at least two front wheels and two rear wheels are hydrostatically driven in each case via an oscillating motor, and the oscillating motors acting on the rear wheels and/or front wheels are adjusted to allow resistance-free flow of transfer medium through each oscillating motor while the wheel reference speed is being ascertained.

In the case of acceleration, the wheel reference speed should be ascertained on the front wheels, viewed in the direction of travel.

When the transfer medium is set to flow resistance-free through the oscillating motors in alternation for the oscillating motors acting on the rear wheels, or, during acceleration, on the front wheels, and in each case the particular wheel reference speed is detected in alternation, the braking distance is not significantly increased during deceleration, and it takes only slightly longer to reach the intended final acceleration speed during acceleration. The controllability of the vehicle remains satisfactory, thus avoiding swerving of the vehicle and endangerment of the driver or occupants of the vehicle.

To prevent inertia-related time delays, it is advantageous that the rotational speed of the wheel in operative connection with the oscillating motor is increased when the oscillating motor is adjusted to allow resistance-free flow of transfer medium through the oscillating motor. When the oscillating motor is swiveled to resistance-free flow, i.e., swiveled to the zero point, the volumetric flow remains constant. The torque is further reduced as the zero point is approached, but the rotational speed is thus temporarily increased due to the fact that the absorption volume of the oscillating motor is further decreased. When a power brake actively brakes the wheel which is accelerated when the operatively linked oscillating motor is adjusted, overacceleration is avoided and the vehicle is thus made relatively fail-safe.

To provide the operating pressure for the hydraulic drive, i.e., for the entire piping, it is advantageous when the operating pressure is provided via a main pump which may be connected to an internal combustion engine. The connection of a main pump to an internal combustion engine is particularly efficient, and may be used under many different conditions. The versatility of such a method and the versatility of the use of a vehicle equipped using this method are greatly increased.

Handling is also improved when a control unit acts on the pilot control units of the oscillating motors, and a pilot control unit acts on the main pump, in a controlling or regulating manner.

The exemplary embodiments and/or exemplary methods of the present invention are described in greater detail below with the aid of a drawings.

DETAILED DESCRIPTION

Figure 1:
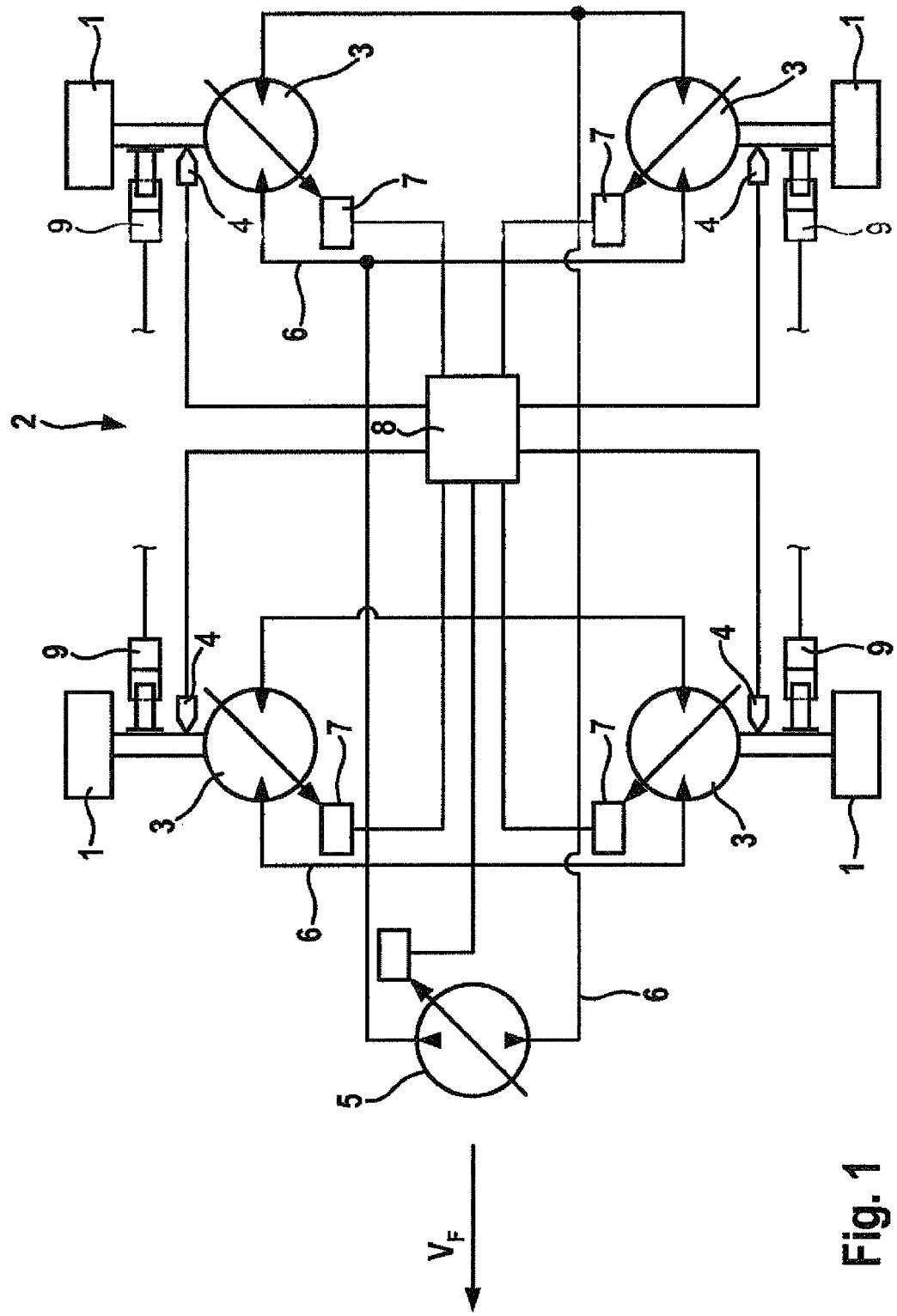
FIG. 1 shows a schematic illustration of a circuit diagram of a vehicle having a hydrostatic individual wheel drive in which the method according to the present invention is used.

FIG. 1 shows four wheels, denoted by reference numeral 1, installed in a vehicle 2 having a hydrostatic drive.

Wheels 1 are each driven via an oscillating motor 3. "Oscillating motors" refer to swivel motors or adjusting motors which for a brief period of time may be alternatingly swiveled to the zero point in such a way that they offer no resistance to the transfer medium, for example mineral oil, flowing through same. The oscillating motors are thus literally cut off from the volumetric flow, and then act neither as a motor nor as a pump, as the result of which the particular wheel runs freely.

The particular wheel speed may be ascertained via wheel speed sensors 4 mounted to each wheel or at least close to each wheel. When vehicle 2 travels at constant speed in the direction of arrow $V_F$, a main pump 5 connected to an internal combustion engine (not illustrated) provides the required pressure of the hydraulic system.

Main pump 5 transmits the pressure to the transfer medium, which in turn conducts the pressure through appropriate pipes to the oscillating motors. Oscillating motors 3 then drive wheels 1. If the vehicle is to be accelerated, main pump 5 transmits more pressure to oscillating motors 3 via pipes 6, resulting in faster rotation of wheels 1.

The wheel speed sensors provide values for the particular actual wheel speed $\Omega_{actual}$.

The actual speed of the wheel, namely $v_{actual}$, is computed in an appropriate computing unit such as a CPU, for example.

A pilot control unit 7 is situated on each oscillating motor 3. Each pilot control unit 7 is designed as an electric motor. These electric motors adjust the oscillating motors in such a way that in their extreme positions the oscillating motors act as either a motor or a pump as a function of the pressures present on the two sides, i.e., the differential pressure. In a neutral position or zero position, the oscillating motors offer no resistance to the transfer medium conveyed in pipes 6.

Pilot control units 7 are connected to a further control unit 8 which acts as a coordinator.

A power brake also optionally acts on wheels 1 in order to brake wheels 1 as needed.

When vehicle 2 is accelerated or decelerated, for a brief moment one of the two oscillating motors 3 is alternatingly swiveled to the zero point at the rear wheels, so that for a short period of time the oscillating motor offers no resistance to the transfer media. During this short period of time the wheel reference speed is ascertained by rotational speed sensors 4 mounted on the rear wheels. The wheel reference speed is then ascertained by the particular wheel speed sensor 4 when the particular oscillating motor 3 is swiveled to the zero point, i.e., acts neither as a motor nor as a pump.

During swiveling to the zero point toward the end of the swivel process, the rear wheel is briefly accelerated to compensate for the inertia-related effects at the wheel, so that the wheel more quickly resumes rolling freely on the road surface.

This method is carried out during deceleration as well as during acceleration, so that reliable values of the wheel reference speed are ascertained during the entire operation of the vehicle. If the acceleration of the wheel is excessive when oscillating motor 3 is at the zero point, the particular wheel 1 is braked via a power brake 9. In FIG. 1 the rear wheels are illustrated on the right side, whereas the front wheels are illustrated on the left side.

Power brakes 9 may also be activated in other situations and under other driving conditions in order to transmit particularly high braking forces and to brake vehicle 2 in a particularly quick manner.

Figure 2:
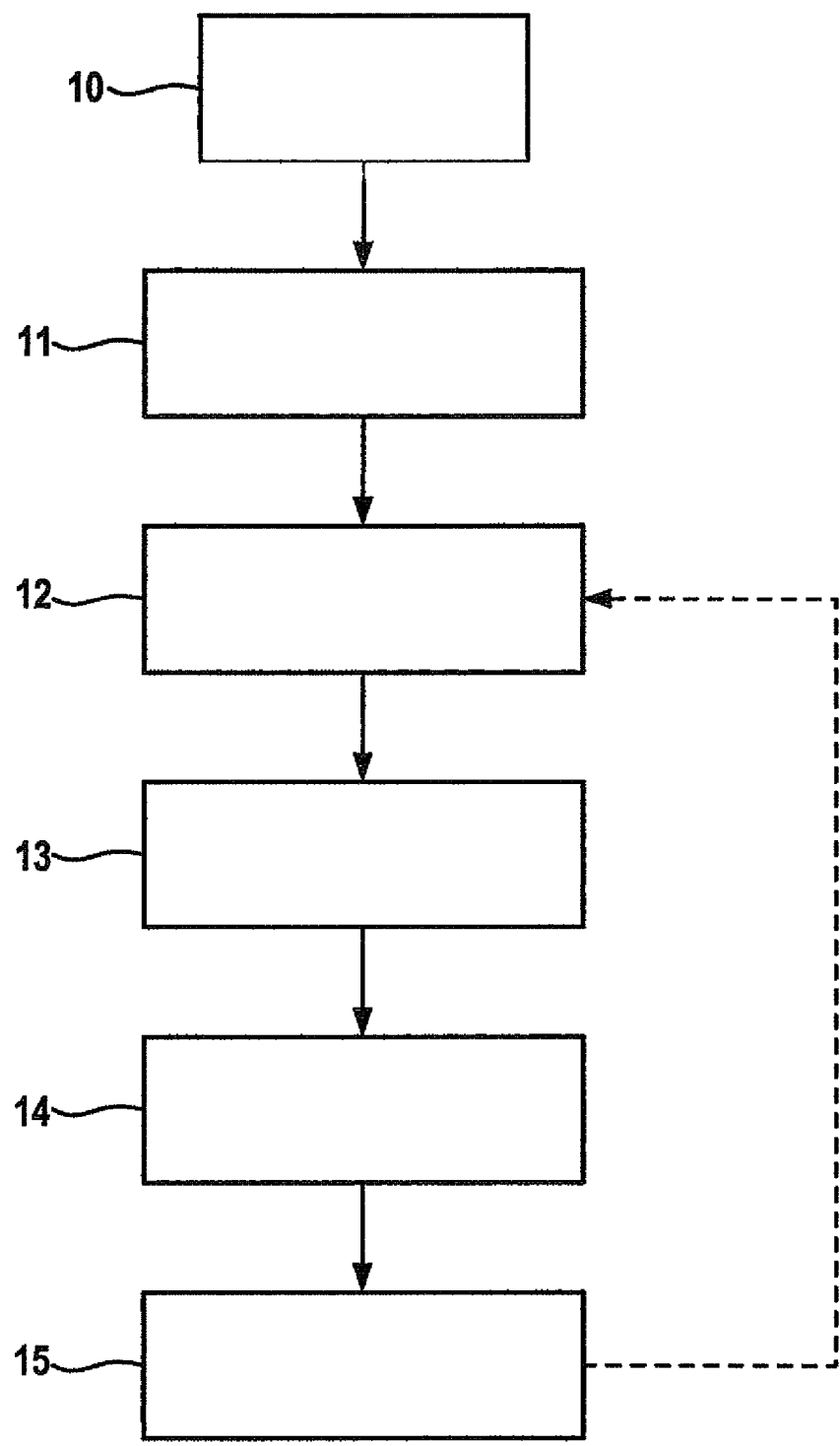
FIG. 2 shows a schematic flow chart for the method according to the present invention.

FIG. 2 illustrates the sequence of the method according to the present invention.

An acceleration or deceleration of the vehicle is carried out and/or registered in a first step 10.

In a subsequent second step 11, oscillating motor 3, which is connected to the right-hand rear wheel, is swiveled to the zero point so that it offers no resistance to the flow of transfer medium through the oscillating motor. The right-hand rear wheel then runs freely once again and rolls normally.

In subsequent step 12 the wheel reference speed is then detected by wheel speed sensor 4 situated near the right-hand rear wheel. The value is then transmitted to a computing unit, illustrated in dashed lines, or is stored, or both.

After step 12, in a step 13 the other oscillating motor 3 situated in the rear region, i.e., oscillating motor 3 connected to the left rear wheel, is swiveled to the zero point, while the oscillating motor for the right-hand rear wheel is switched back to either pump or motor mode, depending on whether the vehicle is braked or accelerated. The wheel reference speed is then measured with the aid of wheel speed sensor 4 mounted in the vicinity of the left rear wheel. The right-hand unit should be in either pump or motor mode before the other unit is swiveled to the zero point.

The value then measured is transmitted to the computing unit, which processes this value together with the previously stored or transmitted wheel reference speed value for the right-hand rear wheel.

After step 15, such a value is then appropriately reused as an output value for subsequent applications.

What is claimed is:

1. A method for determining a wheel reference speed of a wheel of a vehicle having a hydrostatic drive which uses a transfer medium, the hydrostatic drive acting at least on the one wheel, and the hydrostatic drive having an oscillating motor which may be swiveled to a pump mode via which a torque may be applied to the wheel, the method comprising:
   detecting with a wheel speed sensor a wheel speed, the sensor being situated near the wheel; and
   adjusting the oscillating motor to allow resistance-free flow of the transfer medium through the oscillating motor while the wheel speed sensor determines the wheel reference speed, wherein the wheel reference speed represents a speed of the wheel which is free running with the oscillating motor swiveled to a zero point at which the oscillating motor acts as neither a pump nor a motor.

2. The method of claim 1, wherein before the wheel speed sensor determines the wheel reference speed, the oscillating motor is adjusted so that the transfer medium flows through the oscillating motor without resistance.

3. The method of claim 1, wherein at least two front wheels and two rear wheels are hydrostatically driven in each case via oscillating motors, and the oscillating motors acting on at least one of the rear wheels and front wheels are adjusted to allow a resistance-free flow of the transfer medium through each oscillating motor while the wheel reference speed is determined.

4. The method of claim 3, wherein the transfer medium is set to flow resistance-free through the oscillating motors in alternation for the oscillating motors acting on the rear wheels, and in each case the particular wheel reference speed is detected in alternation.

5. The method of claim 1, wherein the rotational speed of the wheel in operative connection with the oscillating motor is increased when the oscillating motor is adjusted to allow resistance-free flow of transfer medium through the oscillating motor.

6. The method of claim 5, wherein a power brake actively brakes the wheel which is accelerated when the operatively linked oscillating motor is adjusted.

7. The method of claim 1, wherein the oscillating motor is adjusted in each case by a pilot control unit which is configured as an electric motor.

8. The method of claim 1, wherein the operating pressure is provided via a main pump which is connected to an internal combustion engine.

9. The method of claim 7, wherein a control unit acts on the pilot control units of the oscillating motors, and a pilot control unit controls the main pump.

10. A device for determining a wheel reference speed of a wheel of a vehicle, comprising:
- a hydraulic drive control unit for a hydrostatic drive, which uses a transfer medium, the hydrostatic drive acting at least on the one wheel, and the hydrostatic drive having an oscillating motor which may be swiveled to a pump mode via which a torque may be applied to the wheel, the hydraulic drive control unit including:
    - a detecting arrangement to detect with a wheel speed sensor a wheel speed, the sensor being situated near the wheel; and
    - an adjusting arrangement to adjust the oscillating motor to allow resistance-free flow of the transfer medium through the oscillating motor while the wheel speed sensor determines the wheel reference speed, wherein the wheel reference speed represents a speed of the wheel which is free running with the oscillating motor swiveled to a zero point at which the oscillating motor acts as neither a pump nor a motor.

\* \* \* \* \*